March 3, 1936. C. E. BREADEN 2,032,910
SCALE
Filed Dec. 10, 1930 3 Sheets-Sheet 1

INVENTOR
Carroll E. Breaden
BY his ATTORNEY

March 3, 1936.  C. E. BREADEN  2,032,910
SCALE
Filed Dec. 10, 1930  3 Sheets-Sheet 2

INVENTOR
Carroll E. Breaden
BY his ATTORNEY

March 3, 1936. C. E. BREADEN 2,032,910
SCALE
Filed Dec. 10, 1930 3 Sheets-Sheet 3
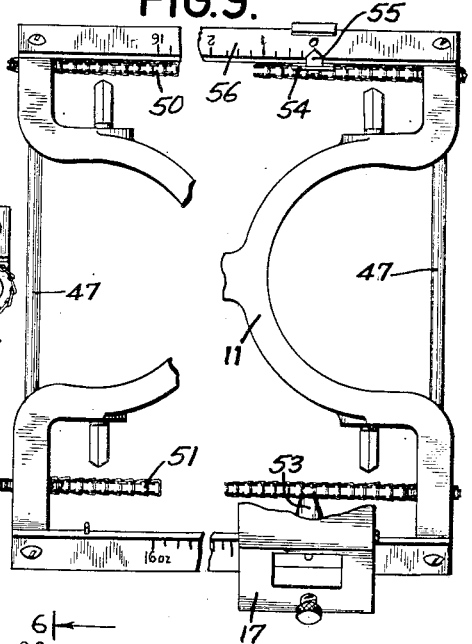
FIG. 9.
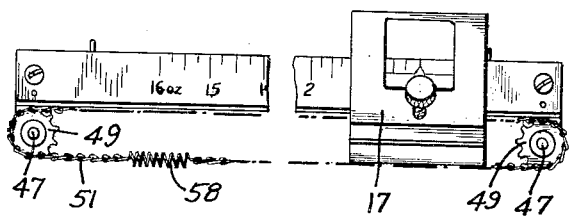
FIG. 10.
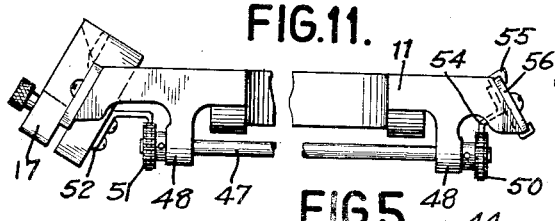
FIG. 11.
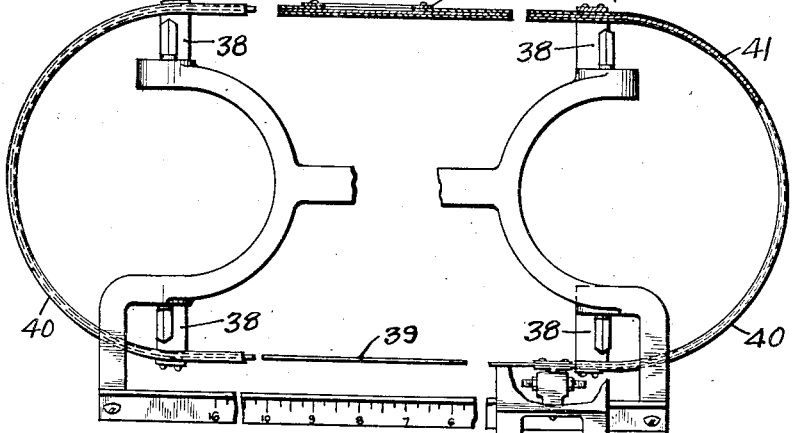
FIG. 5.
FIG. 7.
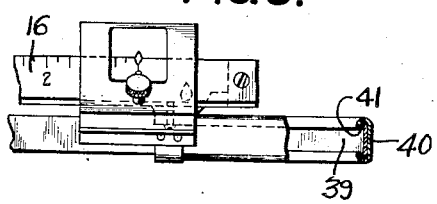
FIG. 8.
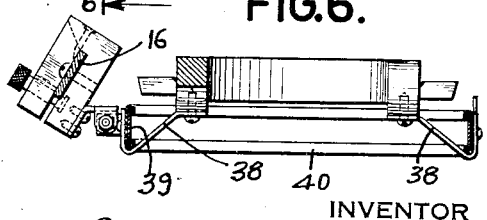
FIG. 6.
INVENTOR
Carroll E. Breaden
BY his ATTORNEY Patented Mar. 3, 1936

2,032,910

UNITED STATES PATENT OFFICE 2,032,910

SCALE

Carroll E. Breaden, Dayton, Ohio, assignor, by mesne assignments, to The Hobart Manufacturing Company, Troy, Ohio, a corporation of Ohio Application December 10, 1930, Serial No. 501,251

2 Claims. (Cl. 265—58)

This case relates to scales of the over-and-under or even balance type.

In this type of scale, it is usual to provide a tare beam and poise on the clerk's side by means of which the tare of a container on one of the pans may be subtracted and the net weight of the article in the container be directly ascertained by the scale indicator. Further it is obvious that such poise and beam may be used to overbalance the beam to one side irrespective of its tare function.

These scales have been objected to because the manipulation and position of the tare poise on the tare beam is not visible to the customer but only to the clerk. In some states, as Ohio, legislation has been passed that all scales used in the presence of a customer must show clearly the tare or added weight.

The object of this invention accordingly is to provide means for indicating to the customer the tare or added weight determined by the position of the poise on the tare beam.

Further the object is to provide an indicator on the customer's side of a scale which will be operated as an incident to the adjustment of the poise on the beam.

Still further, the object is to provide either a pointer movable over a graduated bar on the customer's side of the scale or a graduated tape movable relative to a fixed pointer.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 5 is a plan view similar to Fig. 2 of a second form of the invention.

Fig. 6 is an end view of Fig. 5.

Fig. 7 is a detail of the indication displayed on the customer's side of the scale of Fig. 5.

Fig. 8 is a detail of the indicating device on the merchant's side of the scale in the Fig. 5 form.

Fig. 9 is a plan view of a third form of the invention.

Fig. 10 is a side view of Fig. 9, and

Fig. 11 is an end view of Fig. 9.

Figure 1:
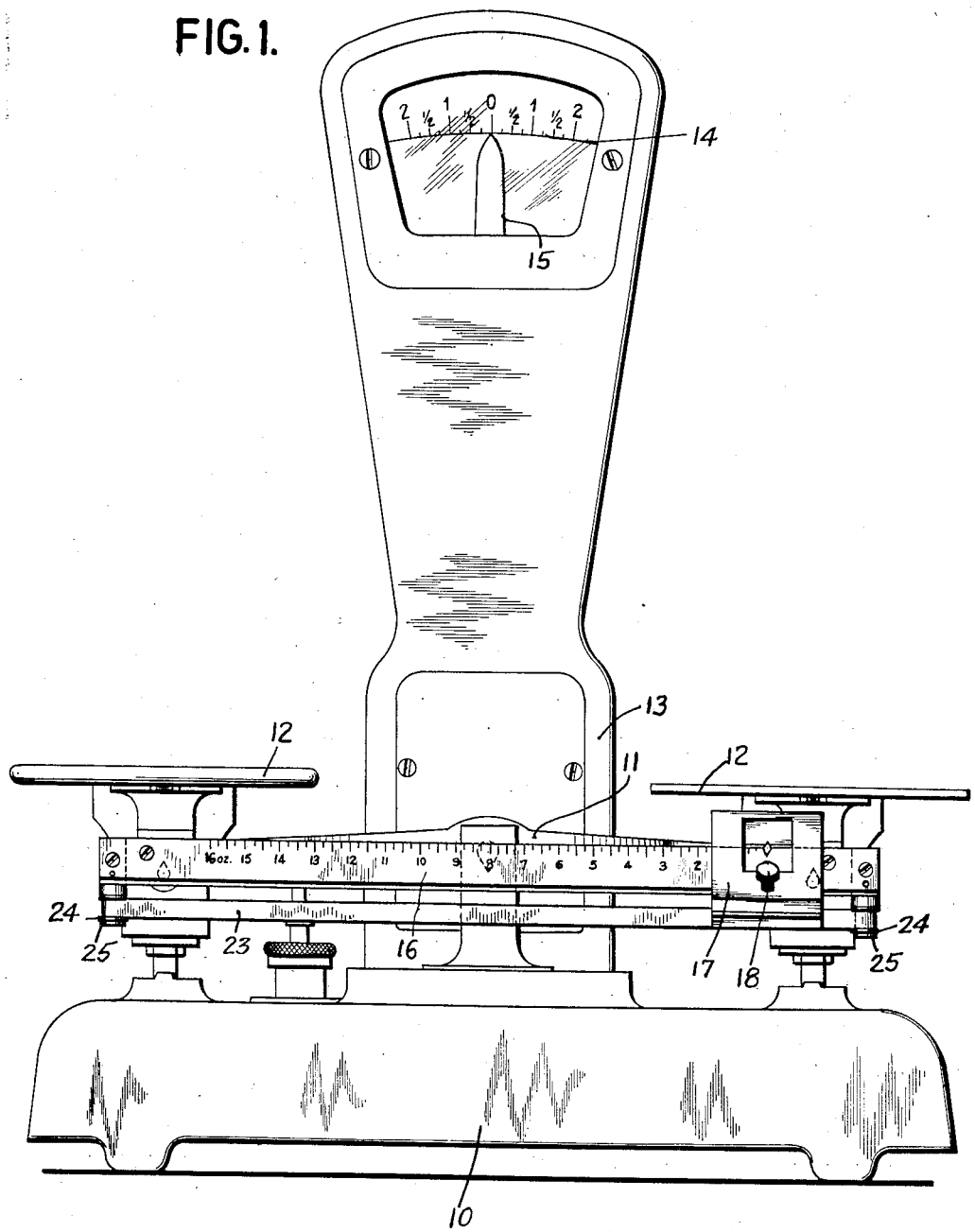
Fig. 1 is a view of the scale from the merchant's side.
Figure 2:
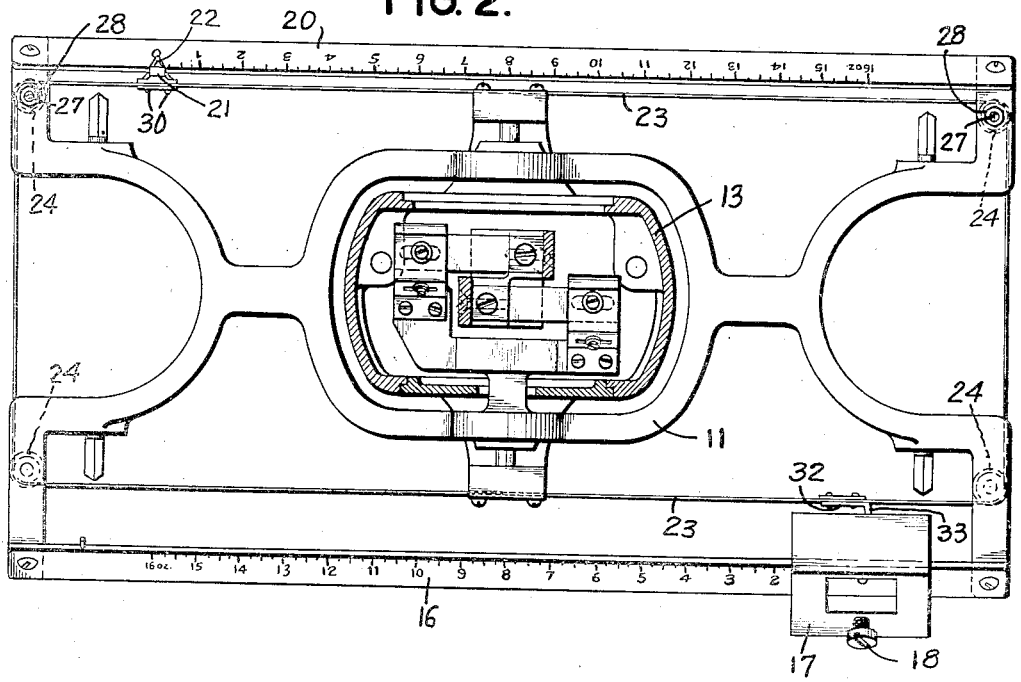
Fig. 2 is a plan view of one form of the invention, with the housing removed from the scale.
Figure 3:
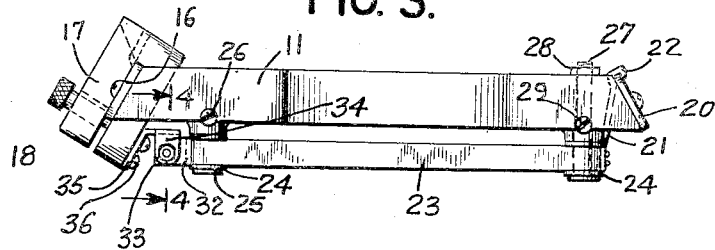
Fig. 3 is an end view of Fig. 2.
Figure 4:
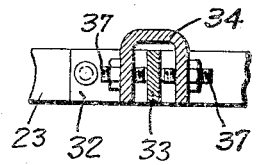
Fig. 4 is a section on line 4—4 of Fig. 3.

In general, referring to Fig. 1, the scale comprises the usual base 10 for fulcruming the even balance beam 11 carrying at each end a pan 12. The central portion of the beam is in the form of a loop through which the indicator housing 13 mounted on the base extends upwardly. Cooperating with a chart 14 in the housing 13 is an indicator 15 secured to the beam 11.

Also secured to the beam 11 on the merchant's side of the scale is the usual tare beam 16 graduated in ounces on which the poise 17 is adjustable. A set screw 18 carried by the poise may engage the beam to fix the poise against movement after adjustment.

The setting of the tare poise is not visible or readable to the customer, his view being obstructed by the scale parts between him and the poise especially the chart housing 13.

To provide an indication of the tare poise setting to the customer, a graduated bar 20 is secured to the beam on the customer's side. The bar 20 is parallel to the tare beam and similarly graduated. Riding on bar 20 is a slide 21 having a pointer 22 coacting with the indications on the bar. The poise 17 and slide 21 are connected by a tape 23. The tape is carried by four flanged rollers 24, disposed in a plane below the beam 11 at the corners of a rectangle, the long sides of which are substantially the tare beam 16 and the indicating bar 20, and the short sides of which are the lines connecting the ends of the tare beam and the bar. At the tare beam side, the rollers are rotatably carried by threaded studs 25 screwed into the under side of the beam and fixed in place by set screws 26. At the side of bar 20, the rollers are freely rotatable on long studs 27 having an eccentric stem passing through the beam and secured thereto by a nut 28. Eccentricity of the stem permits stud 27 to be rotated to adjust the distance of the roller carried thereby from the other rollers, thus providing a means to adjust the tension of the tape. Set screws 29 lock the studs after adjustment.

The tape is fixed to the slide 21 by rivets 30. The connection of the tape to the poise 17 is adjustable longitudinally of the tape to provide for adjusting the poise 17 and slide 21 to read the same marks on both sides of the scale. This securing means comprises a bracket 32 riveted to the tape and having an arm 33 extending transversely from the tape towards the poise. Arm 33 extends between the legs of the U-shaped end 34 of a bracket 35 attached by screws 36 to the side of the poise. Each leg of the U-shaped end 34 has a screw 37 threaded therein, the ends of the screws clamping the arm 33 between them. To set the pointer 22 at the zero of the bar 20 when the poise is at zero on the tare beam 16, the screws 37 are loosened and the tape moved to place the pointer on the zero of the bar when the poise is at zero on the tare beam. After this has been done, the screws 37 are adjusted to clamp the tape and secure it for movement with the poise.

In operation, the poise through brackets 32, 35, and screws 37 moves the tape and the slide 21 carried by the tape to indicate to the customer on bar 20 the position of the poise.

In Figs. 5 to 8, a second form of the invention is shown. A graduated tape 39 is movably guided in a vertically disposed track 41 formed by folding over the edges of a sheet metal member 40 secured to the beam by brackets 38. The member 40 runs parallel to the beam on the customer's side and has semi-circular ends terminating at points adjacent the ends of the tare beam 16. The tape 39 is secured to the poise 17 by the same means as described in the first embodiment of the invention. Adjustment of the poise moves the tape along the track formed in the guide member 40 and brings one of the indications 42 in line with the pointer 43 of a plate 44. The plate is secured to the member 40 at a central point of the customer's side of the scale and both the plate and member 40 are cut away to expose the tape adjacent the pointer.

In Figs. 9 to 11 is shown the third form of the invention. In this form, two shafts 47, one at each end of the scale and extending at right angles to the beam 11, are freely journaled in depending bearing lugs 48 formed in the beam 11. Pinned to opposite ends of each shaft 47 are cog wheels 49, the wheels at the customer's end of the pair of shafts carrying between them a chain 50 and the wheels at the clerk's side carrying a similar chain 51.

Attached to the side of the poise 17 is a bracket 52 having a vertical depending arm 53 extending through the loop of one link of the chain 51. At a point directly opposite the arm 53, the chain 50 carries a bracket 54 secured to a pointer slide 55 riding on indicator bar 56 attached at its ends to the main beam 11. In operation, when the poise 17 is moved through bracket 52 it moves chain 51 thus rotating shafts 47 which transmit the movement to chain 50 thereby moving the pointer 55 in the same direction as the poise.

Each chain is held taut by a coil spring 58 joining the ends of the chain.

While the several forms shown herein are considered as best illustrating the invention, it is understood that other variations of the invention are possible and it is accordingly desired to be limited only by the scope of the following claims:

1. In a scale, a lever, a graduated member connected thereto, an indicating element having graduations thereon corresponding to the graduations of the member, a slide carried by the member, a stationary index cooperating with the indicating element, and means operated by the slide for operating said indicating element whereby the index indicates the position of the slide on the member.

2. In a scale such as described in claim 1, said indicating element comprising a tape, and guide means for said tape connected to the lever.

CARROLL E. BREADEN.